United States Patent
Yeh

(10) Patent No.: US 8,560,926 B2
(45) Date of Patent: Oct. 15, 2013

(54) DATA WRITING METHOD, MEMORY CONTROLLER AND MEMORY STORAGE APPARATUS

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 177 days.

(21) Appl. No.: 13/114,037

(22) Filed: May 23, 2011

(65) Prior Publication Data
US 2012/0272123 A1    Oct. 25, 2012

(30) Foreign Application Priority Data
Apr. 21, 2011   (TW) .............................. 100113924 A

(51) Int. Cl.
*G11C 29/00*    (2006.01)
*G06F 11/00*    (2006.01)
*G11C 16/04*    (2006.01)

(52) U.S. Cl.
USPC ........................ 714/773; 714/746; 365/185.33

(58) Field of Classification Search
USPC .......... 714/773, 746, 738, 736, 718; 711/173, 711/171; 365/185.33, 230.03
See application file for complete search history.

(56) References Cited

U.S. PATENT DOCUMENTS

| | | | | |
|---|---|---|---|---|
| 6,654,867 B2 * | 11/2003 | Wilson et al. | .................. | 711/213 |
| 7,188,227 B2 * | 3/2007 | Luick | .............................. | 711/172 |
| 7,920,590 B2 * | 4/2011 | Le et al. | ......................... | 370/467 |
| 8,386,905 B2 * | 2/2013 | Chu | .............................. | 714/801 |
| 2010/0017561 A1 * | 1/2010 | Yang et al. | ..................... | 711/103 |
| 2010/0042775 A1 * | 2/2010 | Yeh | .............................. | 711/103 |
| 2011/0320915 A1 * | 12/2011 | Khan | ............................ | 714/773 |

* cited by examiner

*Primary Examiner* — Phung M Chung
(74) *Attorney, Agent, or Firm* — Jianq Chyun IP Office

(57) ABSTRACT

A data writing method for writing page data into a rewritable non-volatile memory module is provided, the rewritable non-volatile memory module has a plurality of physical blocks, and each of the physical blocks has a plurality of physical pages. The data writing method includes grouping the physical pages into a plurality of physical page groups according to write speed of each physical page. The data writing method also includes compressing the page data to generate compressed data and calculating a data compression ratio corresponding to the compressed data. The data writing method further includes writing the compressed data into one of the physical pages in a corresponding physical page group among the physical page groups according to the data compression ratio. Accordingly, the data writing method can effectively ensure the accuracy of data stored in the rewritable non-volatile memory module.

16 Claims, 12 Drawing Sheets

DATA WRITING METHOD, MEMORY CONTROLLER AND MEMORY STORAGE APPARATUS

CROSS-REFERENCE TO RELATED APPLICATION

This application claims the priority benefit of Taiwan application serial no. 100113924, filed on Apr. 21, 2011. The entirety of the above-mentioned patent application is hereby incorporated by reference herein and made a part of this specification.

BACKGROUND

1. Technology Field

The present invention relates to a data writing method for a rewritable non-volatile memory module, and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, notebook computers) due to its many characteristics such as data non-volatility, low power consumption, small volume, non-mechanical structure, and fast access speed. A solid state drive (SSD) is a storage apparatus which uses a flash memory as its storage medium. Thus, in recent years, the flash memory industry has become a major part of the electronic industry.

Because error bits may occur in data stored in a flash memory due to various factors (for example, electric leakage of memory cells, program failure, and damage, etc), an error checking and correcting (ECC) circuit is usually configured in a memory storage system and an ECC code is generated for the data stored in the flash memory, so as to ensure the accuracy of the data.

Taking a flash memory storage apparatus as an example, when a computer host connected to the flash memory storage apparatus transmits data to be written to the flash memory storage apparatus, the ECC circuit in the flash memory storage apparatus generates a ECC code for the data and a control circuit in the flash memory storage apparatus writes the data and the ECC code into the flash memory of the flash memory storage apparatus. Subsequently, when the computer host is about to read data from the flash memory storage apparatus, the control circuit reads the data and the corresponding ECC code from the flash memory and the ECC circuit performs an ECC procedure according to the data and the corresponding ECC code to ensure the accuracy of the data.

FIG. 1 is a diagram illustrating the data structure of data written into and read from a flash memory storage apparatus.

Referring to FIG. 1, during the writing process, an original data OD and an ECC code EC corresponding to the original data OD are written into the flash memory storage apparatus. Subsequently, when the original data OD is read from the flash memory storage apparatus, the ECC code EC is also read to perform an ECC procedure on the original data OD. If the data is accurate, the control circuit transmits the data to the computer host, and if there are error bits EB in the data, the ECC procedure performed by the ECC circuit tries to correct these error bits EB. Herein if the number of the error bits EB is smaller than the number of error bits that can be corrected by the ECC circuit, the error bits EB are corrected and the control circuit transmits the corrected data to the computer host. Contrarily, if the number of the error bits EB exceeds the number of error bits that can be corrected by the ECC circuit, the control circuit notifies the computer host that the data is lost.

Thereby, how to ensure the accuracy of data has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method which can correct more error bits and ensure data accuracy.

The present invention is directed to a memory controller which can correct more error bits and ensure data accuracy.

The present invention is directed to a memory storage apparatus which is highly reliable and can effectively ensure data accuracy.

According to an exemplary embodiment of the present invention, a data writing method for writing page data into a rewritable non-volatile memory module is provided, wherein the rewritable non-volatile memory module has a plurality of physical blocks, and each of the physical blocks has a plurality of physical pages. The data writing method includes grouping the physical pages into a plurality of physical page groups according to write speed of each physical page. The data writing method also includes compressing the page data to generate compressed data and calculating a data compression ratio between the page data and the compressed data. The data writing method further includes writing the compressed data into one of the physical pages of a corresponding physical page group according to the data compression ratio.

According to an exemplary embodiment of the present invention, a data writing method for writing page data into a rewritable non-volatile memory module is provided, wherein the rewritable non-volatile memory module has a plurality of physical blocks, each of the physical blocks has a plurality of physical pages, and the physical pages are categorized into a plurality of fast physical pages and a plurality of slow physical pages. The data writing method includes grouping the physical blocks into a first physical block group and a second physical block group. The data writing method also includes compressing the page data to generate compressed data and calculating a data compression ratio corresponding to the compressed data. The data writing method still includes determining whether the data compression ratio corresponding to the compressed data is greater than a predetermined threshold. The data writing method further includes, when the data compression ratio corresponding to the compressed data is greater than the predetermined threshold, writing the compressed data into a fast physical page or a slow physical page among the physical pages of the physical blocks belonging to the second physical block group; and when the data compression ratio corresponding to the compressed data is not greater than the predetermined threshold, writing the compressed data into a fast physical page among the physical pages of the physical blocks belonging to the first physical block group.

According to an exemplary embodiment of the present invention, a memory controller for writing page data from a host system into a rewritable non-volatile memory module is provided, wherein the rewritable non-volatile memory module has a plurality of physical blocks, and each of the physical blocks has a plurality of physical pages. The memory controller includes a host interface, a memory interface, a data compression/decompression circuit, and a memory management circuit. The host interface is configured to couple to the host system, and the memory interface is configured to couple to the rewritable non-volatile memory module. The data compression/decompression circuit is coupled to the host interface. The data compression/decompression circuit compresses the page data to generate compressed data and calculates a data compression ratio corresponding to the compressed data. The memory management circuit is coupled to the data compression/decompression circuit. The memory management circuit groups the physical pages into a plurality of physical page groups according to write speed of each physical page and writes the compressed data into one of the physical pages belonging to a corresponding physical page group through the memory interface according to the data compression ratio.

According to an exemplary embodiment of the invention, a memory storage apparatus includes a connector, a rewritable non-volatile memory module, and a memory controller. The connector is configured to couple to a host system. The rewritable non-volatile memory module has a plurality of physical blocks, and each of the physical blocks has a plurality of physical pages. The memory controller is coupled to the connector and the rewritable non-volatile memory module. The memory controller is configured to receive page data from the host system, compress the page data to generate compressed data, and calculate a data compression ratio corresponding to the compressed data. The memory controller is further to group the physical pages into a plurality of physical page groups according to write speed of each physical page and write the compressed data into one of the physical pages belonging to a corresponding physical page group according to the data compression ratio As described above, the data writing method, the memory controller, and the memory storage apparatus according to the exemplary embodiments of the invention can effectively correct more error bits and ensure data accuracy.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
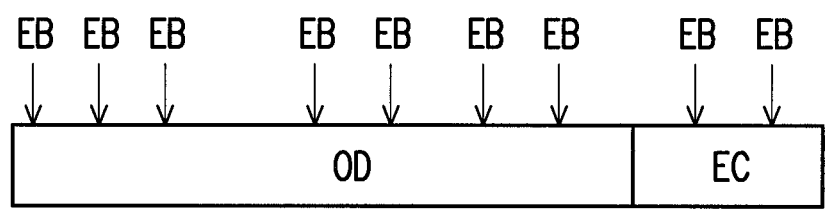
FIG. 1 is a diagram illustrating the data structure of data written into and read from a flash memory storage apparatus.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 2A:
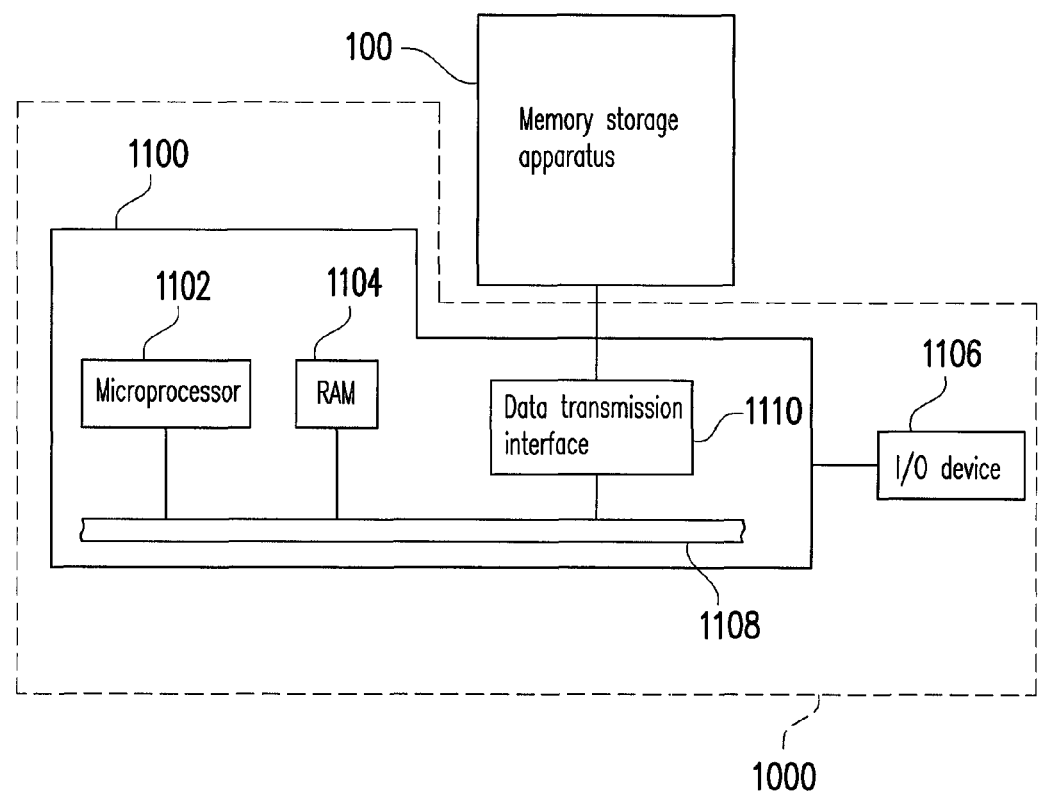
FIG. 2A illustrates a host system and a memory storage apparatus according to an exemplary embodiment of the invention.

FIG. 2A illustrates a host system and a memory storage apparatus according to an exemplary embodiment of the invention.

Referring to FIG. 2A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

Figure 2B:
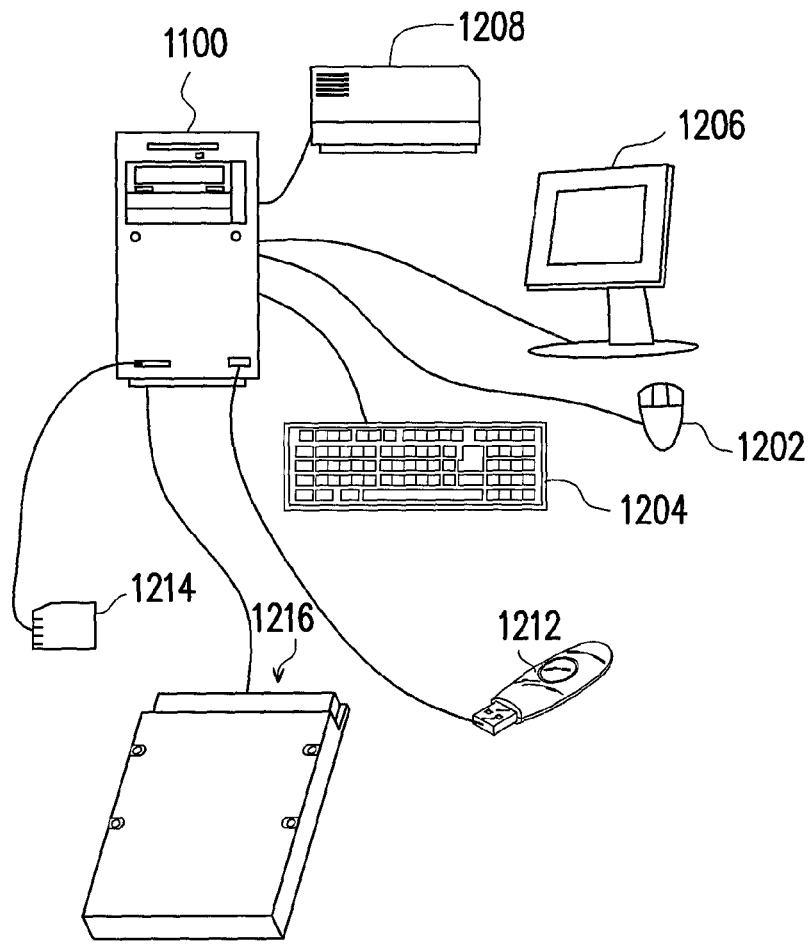
FIG. 2B is a diagram of a computer, an input/output (I/O) device, and a memory storage apparatus according to an exemplary embodiment of the invention.

In the present embodiment, the memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. The memory storage apparatus 100 may be a rewritable non-volatile memory storage apparatus, such as the flash drive 1212, the memory card 1214, or the solid state drive (SSD) 1216 illustrated in FIG. 2B.

Figure 2C:
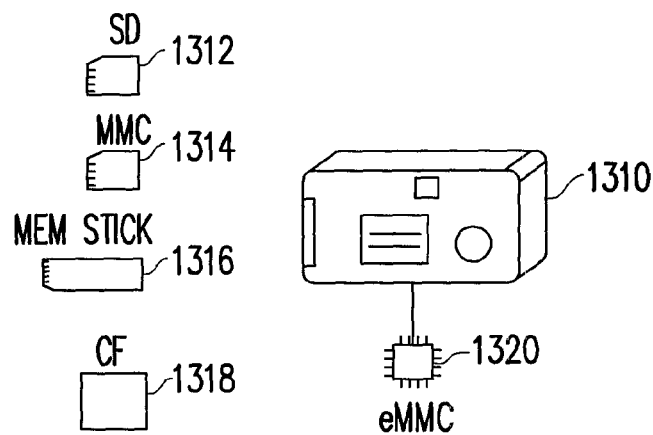
FIG. 2C is a diagram of a host system and a memory storage apparatus according to another exemplary embodiment of the invention.

Generally, the host system 1000 may be substantially any system which can work with the memory storage apparatus 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage apparatus is then a secure digital (SD) card 1312, a multi media card (MMC) card 1314, a memory stick (MS) 1316, a compact flash (CF) card 1318, or an embedded storage device 1320 (as shown in FIG. 2C) used by the digital camera (video camera) 1310. The embedded storage device 1320 includes an embedded MMC (eMMC). It should be mentioned that the eMMC is directly coupled to the motherboard of the host system.

Figure 3:
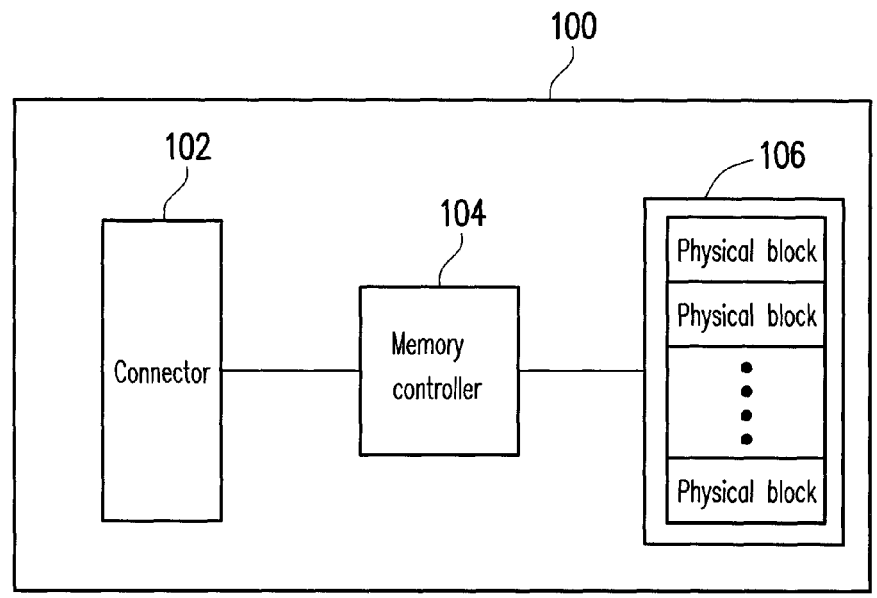
FIG. 3 is a schematic block diagram of the memory storage apparatus in FIG. 2A.

FIG. 3 is a schematic block diagram of the memory storage apparatus in FIG. 2A.

Referring to FIG. 3, the memory storage apparatus 100 includes a connector 102, a memory controller 104, and a rewritable non-volatile memory module 106.

In the present exemplary embodiment, the connector 102 complies with the serial advanced technology attachment (SATA) standard. However, the invention is not limited thereto, and the connector 102 may also comply with the Institute of Electrical and Electronic Engineers (IEEE) 1394 standard, the peripheral component interconnect (PCI) express standard, the parallel advanced technology attachment (PATA) standard, the universal serial bus (USB) standard, the SD interface standard, the MS interface standard, the MMC interface standard, the CF interface standard, the integrated device electronics (IDE) standard or any other suitable standard.

The memory controller 104 executes a plurality of logic gates or control instructions implemented in a hardware form or a firmware form and performs various data operations on the rewritable non-volatile memory module 106 according to commands issued by the host system 1000.

The rewritable non-volatile memory module 106 is coupled to the memory controller 104 and configured to store data written by the host system 1000. In the present exemplary embodiment, the rewritable non-volatile memory module 106 is a multi level cell (MLC) NAND flash memory module.

The rewritable non-volatile memory module 106 has a plurality of physical blocks. These physical blocks may belong to the same memory die or different memory dies. Each of the physical blocks has a plurality of physical pages, wherein the physical pages belonging to the same physical block may be individually written but have to be erased all together. To be specific, physical block is the smallest unit for erasing data. Namely, each physical block contains the least number of memory cells that are erased together.

Each physical block may be composed of 128 physical pages. However, the present invention is not limited thereto, and each physical block may also be composed of 64, 256, or any other number of physical pages. Each physical page includes a user data bit area and a redundancy bit area. The user data bit area is used for storing user data, while the redundancy bit area is used for storing system data (for example, error checking and correcting (ECC) codes). Herein, one physical page capacity (i.e., the capacity of each physical page) is defined as the capacity of its user data bit area plus the capacity of its redundancy bit area. For example, in the present exemplary embodiment, the user data bit area in each physical page has a capacity of 2 kilobytes (KB), and the redundancy bit area has a capacity of 64 bytes. However, the invention is not limited thereto.

Figure 4:
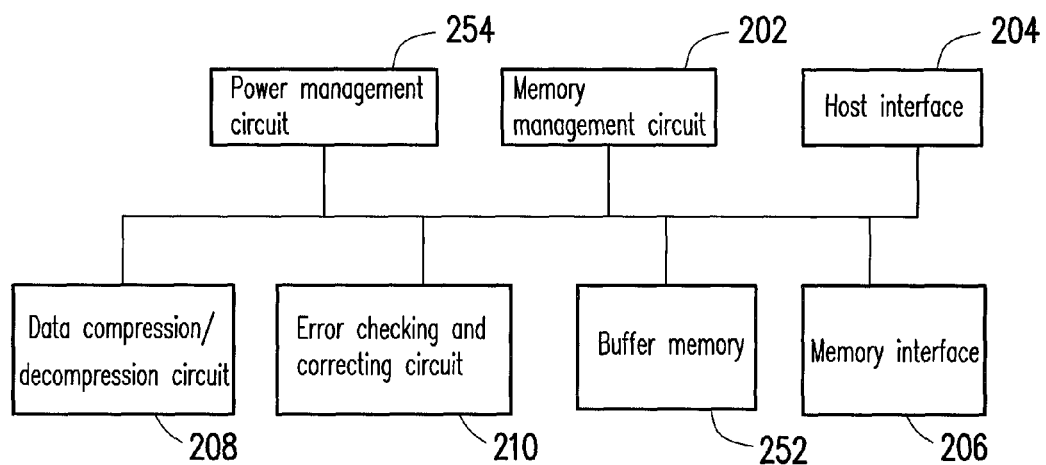
FIG. 4 is a schematic block diagram of a memory controller according to an exemplary embodiment of the invention.

FIG. 4 is a schematic block diagram of a memory controller according to an exemplary embodiment of the invention.

Referring to FIG. 4, the memory controller 104 includes a memory management circuit 202, a host interface 204, a memory interface 206, a data compression/decompression circuit 208, and an ECC circuit 210.

The memory management circuit 202 controls the overall operation of the memory controller 104. To be specific, the memory management circuit 202 has a plurality of control instructions, and when the memory storage apparatus 100 is in operation, the control instructions are executed to perform various data operations.

For example, data has to be written into a physical block according to the sequence of the physical pages. Besides, a physical page that has stored data should be erased before it is used for writing new data. Thus, in the present exemplary embodiment, the memory management circuit 202 groups the physical blocks into a data area and a free area.

The physical blocks of the data area have stored data (for example, data written by a host system), and the physical blocks of the free area are used for substituting the physical blocks of the data area. To be specific, as described above, physical blocks that have stored data have to be erased before they are used for writing data again, and the physical blocks of the free area are used for writing update data to substitute those physical blocks originally mapped to logical blocks. Accordingly, the physical blocks of the free area are either blank or usable blocks (i.e., no data is recorded therein or data recorded therein is marked as invalid data).

As described above, the physical pages of the physical blocks belonging to the data area and the physical pages of the physical blocks belonging to the free area are alternatively used for storing data written by the host system 1000. In order to allow the host system 1000 to access the physical pages which are alternatively used for storing data, the memory management circuit 202 configures logical blocks and maps the logical access addresses accessed by the host system 1000 to logical pages of the logical blocks.

To be specific, the memory storage apparatus 100 converts the logical access addresses accessed by the host system 1000 into corresponding logical pages and reflects the alternation of the physical pages by recording the mapping relationship between the logical pages and the physical pages of the data area in a mapping table. Thus, the host system 1000 simply accesses data according to the logical access addresses while the memory management circuit 202 actually reads data from or writes data into the corresponding physical pages according to the mapping table.

In the present exemplary embodiment, the control instructions of the memory management circuit 202 are implemented in a firmware form. For example, the memory management circuit 202 has a microprocessor unit (not shown) and a read-only memory (ROM, not shown), and these control instructions are burnt into the ROM. When the memory storage apparatus 100 is in operation, the control instructions are executed by the microprocessor unit to perform various data operations.

In another exemplary embodiment of the invention, the control instructions of the memory management circuit 202 may also be stored in a specific area of the rewritable non-volatile memory module 106 (for example, the system area exclusively used for storing system data in a rewritable non-volatile memory module) as program codes. In addition, the memory management circuit 202 has a microprocessor unit (not shown), a ROM (not shown), and a RAM (not shown). Particularly, the ROM has a driver code, and when the memory controller 104 is enabled, the microprocessor unit first executes the driver code to load the control instructions from the rewritable non-volatile memory module 106 into the RAM of the memory management circuit 202. After that, the microprocessor unit runs these control instructions to perform various data operations. Additionally, in yet another exemplary embodiment of the present invention, the control instructions of the memory management circuit 202 may also be implemented in a hardware form.

The host interface 204 is coupled to the memory management circuit 202 and configured to receive and identify commands and data sent by the host system 1000. Namely, commands and data sent by the host system 1000 are transmitted to the memory management circuit 202 via the host interface 204. In the present exemplary embodiment, the host interface 204 complies with the SATA standard. However, the present invention is not limited thereto, and the host interface 204 may also comply with the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

The data compression/decompression circuit 208 is coupled to the memory management circuit 202. The data compression/decompression circuit 208 is configured to compress data to be written into the rewritable non-volatile memory module 106 and decompress data to be read from the rewritable non-volatile memory module 106. The data compression/decompression circuit 208 may include a compressor and a decompressor. The compressor finds data redundancy from original data, removes the data redundancy, encodes the remaining essential data, and outputs the encoded data (i.e., compressed data). The decompressor decodes the compressed data through a predetermined procedure and sends out the decoded data (i.e., decompressed data). In the present exemplary embodiment, the data compression/decompression circuit 208 compresses data by using a lossless compression algorithm in order to make sure that the compressed data can be restored.

The ECC circuit 210 is coupled to the memory management circuit 202 and configured to execute an ECC procedure to ensure data accuracy. To be specific, when a write command is executed, the ECC circuit 210 generates a corresponding ECC code to the data to be written, and the memory management circuit 202 writes the data and the corresponding ECC code into the rewritable non-volatile memory module 106. When subsequently the memory management circuit 202 reads the data from the rewritable non-volatile memory module 106, it also reads the ECC code corresponding to the data, and the ECC circuit 210 executes the ECC procedure on the data according to the ECC code.

To be specific, the memory management circuit 202 generates an ECC frame according to the received data and the corresponding ECC code and writes the ECC frame into the rewritable non-volatile memory module 106. When subsequently the memory management circuit 202 reads the data from the rewritable non-volatile memory module 106, the ECC circuit 210 verifies the accuracy of the data according to the ECC code in the ECC frame. In the present exemplary embodiment, one ECC frame contains user data of 2 KB, and accordingly, one physical page can store one ECC frame. However, the present invention is not limited thereto, in another exemplary embodiment, one ECC frame may also contain user data of 512 bytes or 1 KB. Namely, one physical page can store multiple ECC frames.

It should be mentioned that the number of error bits that can be corrected by the ECC circuit 210 is in direct ratio to the size of the ECC code. Namely, the more error bits the ECC circuit 210 is designed to correct, the more storage space is needed for storing an ECC code. Since the capacity of the redundancy bit area for storing ECC codes is fixed (which varies with the type of the rewritable non-volatile memory module), the ECC algorithm adopted by the ECC circuit 210 is limited by the type of the rewritable non-volatile memory module 106. For example, in the present exemplary embodiment, the ECC circuit 210 can correct at most 40 error bits. Namely, the ECC circuit 210 can successfully correct the error bits as long as the number of the error bits occurring in the read data does not exceed 40.

In another exemplary embodiment, the memory controller 104 further includes other function modules. For example, the memory controller 104 further includes a buffer memory 252 and a power management circuit 254. The buffer memory 252 is coupled to the memory management circuit 202 and configured to temporarily store data and commands from the host system 1000 or data from the rewritable non-volatile memory module 106. The power management circuit 254 is coupled to the memory management circuit 202 and configured to control the power supply of the memory storage apparatus 100.

In the present exemplary embodiment, when data is to be written into the rewritable non-volatile memory module 106, the data compression/decompression circuit 208 compresses the data, and the ECC circuit 210 generates the corresponding ECC code according to the compressed data. Since the compressed data is shorter in length, the protection capability of the ECC circuit 210 is relatively improved.

Figure 5:
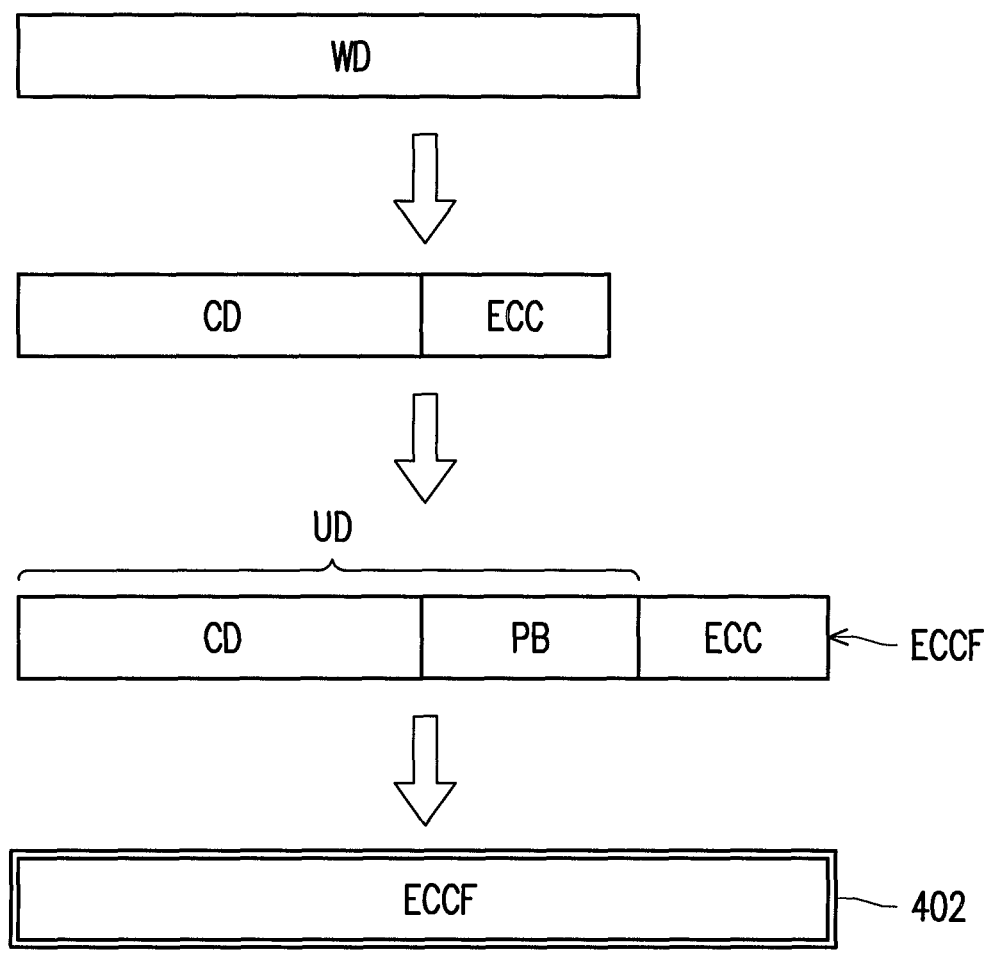
FIG. 5 is a diagram illustrating how data is written into a physical page according to an exemplary embodiment of the invention.

FIG. 5 is a diagram illustrating how data is written into a physical page according to an exemplary embodiment of the invention.

Referring to FIG. 5, when the memory management circuit 202 is about to write page data WD of 2 KB into the physical page 402, the data compression/decompression circuit 208 compresses the page data WD to output compressed data CD. Then, the ECC circuit 210 generates a corresponding ECC code ECC according to the compressed data CD. And, the memory management circuit 202 combines the compressed data CD, the ECC code ECC, and a padding bit data PB to generate an ECC frame ECCF.

To be specific, the data compression/decompression circuit 208 compresses data by using a lossless compression algorithm. However, the compressed data obtained by compressing different page data has different sizes. In the present exemplary embodiment, because the rewritable non-volatile memory module 106 is written in a unit of each physical page and one physical page can store one ECC frame, the memory management circuit 202 pads the ECC frame ECCF with padding bit data PB, so as to make the size of the ECC frame ECCF to be equal to the size (i.e., capacity) of one physical page. For example, if compressed data of 1 KB is generated by compressing page data of 2 KB, the memory management circuit 202 pads the ECC frame ECCF with padding bit data PB of 1 KB, so that the quantity of data programmed into the user data bit area remains at 2 KB. Herein the padding bit data PB is "F". However, the present invention is not limited thereto, and the padding bit data may be any symbol. In particular, the memory management circuit 202 stores padding information to record the number of padding bit data padded the compressed data CD. The padding information may be recorded in physical blocks of the rewritable non-volatile memory module 106 which are used for storing system data or stored in a mapping table. Even though the padding bit data PB is filled behind the compressed data CD in the present exemplary embodiment, the present invention is not limited thereto, and the padding bit data PB may also be placed in front of the compressed data CD.

Thereafter, the memory management circuit 202 writes the ECC frame ECCF containing the compressed data CD, the padding bit data PB, and the ECC code ECC into a physical page of the rewritable non-volatile memory module 106, wherein the compressed data CD and the padding bit data PB are considered as user data UD and written into the user data bit area, and the ECC code ECC is written into the redundancy bit area.

It should be mentioned that in the present exemplary embodiment, the memory management circuit 202 inserts the padding bit data PB between the compressed data CD and the ECC code ECC to maintain the user data UD at a predetermined size (for example, 2 KB). However, in another exemplary embodiment of the invention, the memory management circuit 202 may also obtain partial bit data (also referred to as sub page data) from the page data to be written and performs aforementioned padding operation by using the obtained sub page data, so as to maintain the user data UD at the predetermined size. Namely, the memory management circuit 202 combines the compressed data, the sub page data among the page data, and the ECC code to generate an ECC frame. For example, when the size of the compressed data CD is 1 KB, the memory management circuit 202 obtains the first 1 KB or the second 1 KB of sub page data from the original page data to perform aforementioned padding operation. In particular, this part of the original page data used for padding purpose may also be used as assistant information for correcting error bits to ensure the data accuracy when the ECC procedure is executed.

Moreover, in another exemplary embodiment, the memory management circuit 202 may also generate the ECC frame by using no padding bit data. Instead, the memory management circuit 202 directly sends the compressed data CD and the ECC code ECC to the rewritable non-volatile memory module 106 to execute a writing operation. To be specific, a control circuit (not shown) of the rewritable non-volatile memory module 106 inserts dummy data behind the compressed data CD and the ECC code ECC and programs the compressed data and the ECC code into one physical page as well as the dummy data.

Subsequently, when the memory management circuit 202 is about to read data from the physical page 402 for the host system 1000, the memory management circuit 202 and the data compression/decompression circuit 208 restore the data through an inverse procedure.

Figure 6:
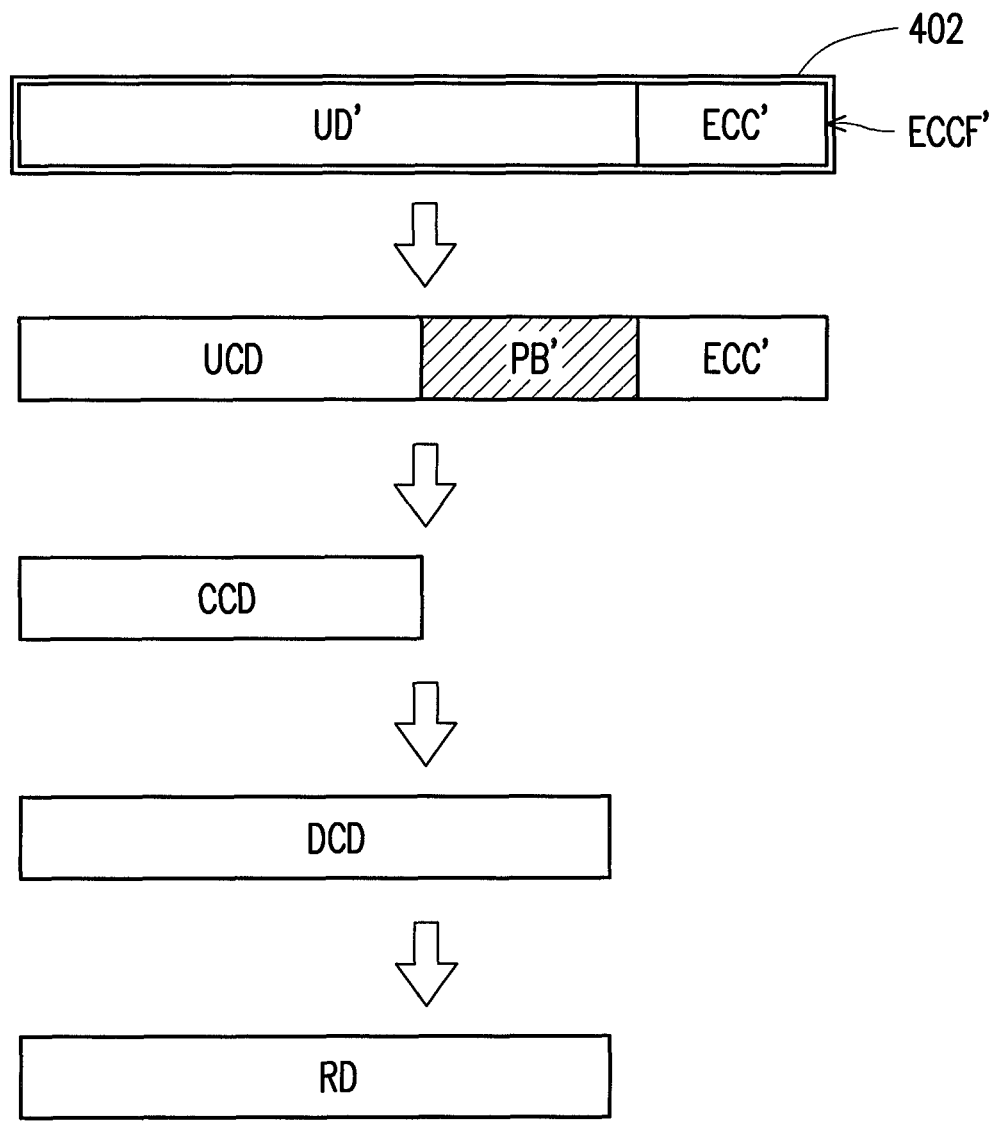
FIG. 6 is a diagram illustrating how data is read from a physical page according to an exemplary embodiment of the invention.

FIG. 6 is a diagram illustrating how data is read from a physical page according to an exemplary embodiment of the invention.

Referring to FIG. 6, it is assumed that the host system 1000 is about to read data from the physical page 402 (i.e., the previously written page data WD). First, the memory management circuit 202 reads an ECC frame ECCF' from the physical page 402, wherein the ECC frame ECCF' contains user data UD' corresponding to the user data UD and an ECC code ECC' corresponding to the ECC code ECC.

Then, the memory management circuit 202 obtains an uncorrected data UCD from the user data UD'. To be specific, the memory management circuit 202 deletes the padding bit data PB' from the user data UD' according to the padding information to obtain the uncorrected data UCD corresponding to the compressed data CD.

Next, the ECC circuit 210 performs the ECC procedure on the uncorrected data UCD according to the ECC code ECC' to generate a corrected data CCD. Herein, the ECC circuit 210 can successfully correct the error bits when the number of the error bits occurring in the ECC code ECC' and the uncorrected data UCD is smaller than 40.

After that, the data compression/decompression circuit 208 decompresses the corrected data CCD to generate a decompressed data DCD.

Finally, the memory management circuit 202 sends the decompressed data DCD to the host system 1000 as a read data RD to be read by the host system 1000.

Figure 7:
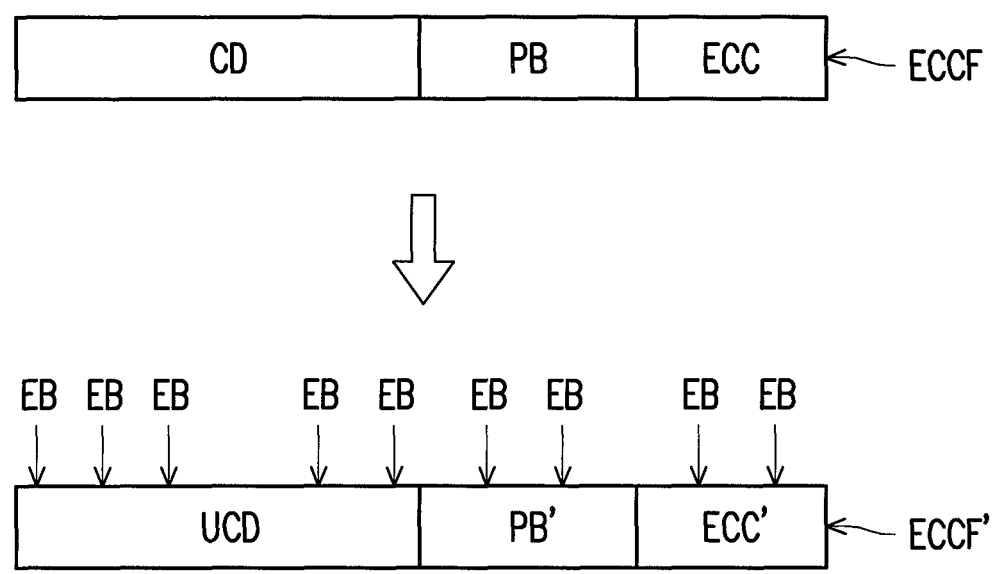
FIG. 7 is a simplified diagram illustrating an error bit distribution according to an exemplary embodiment of the invention.

FIG. 7 is a simplified diagram illustrating an error bit distribution according to an exemplary embodiment of the invention. Herein, the error bit distribution is the same as that illustrated in FIG. 1, and it is assumed that in FIG. 1, the original data OD cannot be restored by using the ECC code ECC because the number of error bits exceeds the number of error bits (for example, 7) that can be corrected by the ECC circuit 210.

Referring to FIG. 7, because the ECC code ECC is generated according to the compressed data CD during the data writing operation, the uncorrected data UCD corresponding to the compressed data CD is corrected according to the ECC code ECC' during the data reading operation. Herein, because there are 7 error bits EB in the uncorrected data UCD and ECC code ECC', the ECC circuit 210 can successfully correct the uncorrected data UCD to restore the compressed data CD. To be specific, as shown in FIG. 7, 2 of the 9 error bits EB are in the padding bit data PB', while the uncorrected data UCD and the ECC code ECC' only contain 7 error bits EB. Thus, the number of error bits to be corrected does not exceed the number of error bits correctable to the ECC circuit 210. Besides, subsequently the compressed data CD can be successfully decompressed to obtain the read data RD (i.e., the original page data WD).

In the present exemplary embodiment, besides compressing data to improve the error correction capability, the memory management circuit 202 further groups the physical pages in the physical blocks into different physical page groups according to the physical characteristic (for example, write speed) of each physical page and writes compressed data into physical pages of physical page groups having different reliabilities according to data compression ratios corresponding to the compressed data generated by the data compression/decompression circuit 208, so that the data accuracy can be further ensured.

To be specific, because only single-level programming can be executed to program memory cells in a single level cell (SLC) NAND flash memory, each memory cell can only store one bit. While the programming of physical blocks in a MLC NAND flash memory can be divided into multiple phases. Taking a 4-level memory cell as an example, the programming of such a memory cell can be carried out in two phases. During the first phase, bits in lower physical pages are programmed, and the physical characteristic of the lower physical pages is similar to that of a SLC NAND flash memory. Bits in the upper physical pages are programmed after the first phase is completed. In particular, the write speed of a lower physical page (i.e. the speed of writing data into a lower physical page) is faster than that of an upper physical page (i.e. the speed of writing data into an upper physical page) and the reliability of a lower physical page is higher than that of an upper physical page. Thus, if the rewritable non-volatile memory module 106 is a 4-level cell NAND flash memory module, the memory management circuit 202 groups the physical pages in each physical block into a first physical page group and a second physical page group, wherein the speed for writing data into the physical pages (referred to as first physical pages thereinafter) belonging to the first physical page group is faster than that for writing data into the physical pages (referred to as second physical pages thereinafter) belonging to the second physical page group. Herein, the first physical pages may also be referred to as lower physical pages or fast physical pages, and the second physical pages may also be referred to as upper physical pages or slow physical pages.

Similarly, an 8-level memory cell or a 16-level memory cell includes more physical pages and data is written in more phases. Herein the physical pages having the fastest write speed are referred to as the fast physical pages and the other physical pages having slower write speeds are referred to as slow physical pages. In addition, in other embodiments, the slow physical pages may also be the physical pages having the slowest write speed or the physical pages having the slowest write speed and some physical pages having their write speeds faster than the slowest write speed.

For example, in a 16-level memory cell, the fast physical pages are physical pages having the fastest and second fastest write speeds, and the slow physical pages are physical pages having the slowest and the second slowest write speeds.

Or, in another exemplary embodiment, the physical pages having different write speeds are respectively grouped into corresponding physical page groups. For example, in an 8-level memory cell, the physical pages having the fastest write speed (also referred to as fast physical pages) are grouped into the first physical page group, the physical pages having the second fastest write speed (also referred to as medium physical pages) are grouped into the second physical page group, and the physical pages having the slowest write speed (also referred to as slow physical pages) are grouped into a third physical page group.

In the present exemplary embodiment, the memory management circuit 202 establishes a physical page type table to record physical pages belonging to different physical page groups.

In the present exemplary embodiment, when page data to be written is received from the host system 1000, the data compression/decompression circuit 208 compresses the page data to generate compressed data corresponding to the page data and calculates a data compression ratio corresponding to the compressed data. Herein the data compression ratio is obtained by dividing the size of the original data by the size of the compressed data. In particular, the memory management circuit 202 writes compressed data with greater data compression ratios into the second physical pages belonging to the second physical page group and compressed data with smaller data compression ratios into the first physical pages belonging to the first physical page group.

Figure 8A:
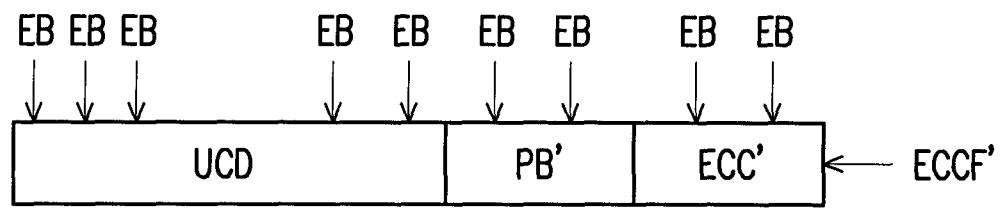
FIG. 8A and FIG. 8B are diagrams illustrating error bit distributions with different data compression ratios according to an exemplary embodiment of the invention.
Figure 8B:
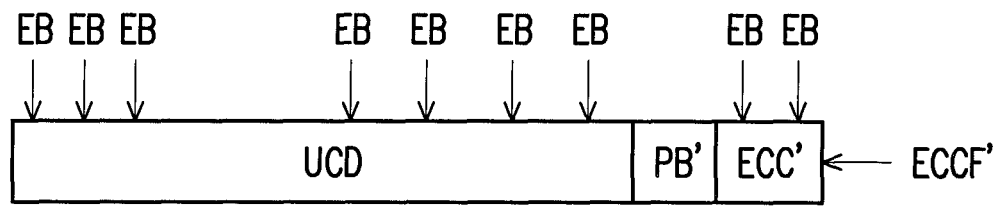

FIG. 8A and FIG. 8B are diagrams illustrating error bit distributions with different data compression ratios according to an exemplary embodiment of the invention.

Referring to FIG. 8A, when the size of the compressed data is smaller (i.e., the compressed data has a greater data compression ratio), with the same error bit distribution, there will be fewer error bits in the uncorrected data. Namely, the ECC circuit 210 can still successfully correct error data when there are more error bits. Accordingly, the memory management circuit 202 writes the compressed data into a physical page with a relatively lower reliability (for example, a second physical page belonging to the second physical page group).

Referring to FIG. 8B, when the size of the compressed data is larger (i.e., the compressed data has a smaller data compression ratio), with the same error bit distribution, there are more error bits in the uncorrected data. Namely, with the same error bit distribution, compressed data having a smaller data compression ratio contains more error bits than compressed data having a greater data compression ratio. Accordingly, the memory management circuit 202 writes the compressed data into a physical page having a higher reliability (for example, a first physical page belonging to the first physical page group).

Figure 9:
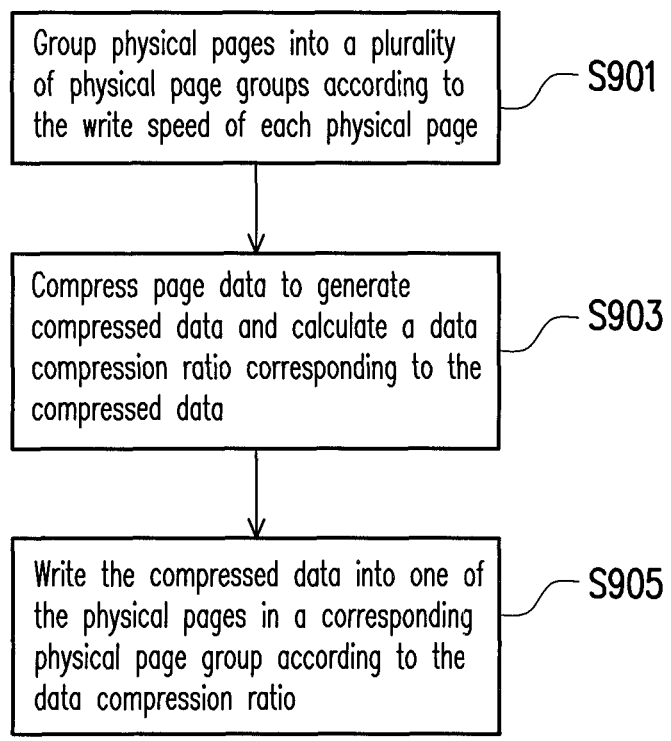
FIG. 9 is a flowchart of a data writing method according to an exemplary embodiment of the invention.

FIG. 9 is a flowchart of a data writing method according to an exemplary embodiment of the invention, wherein the steps of writing a page data belonging to a logical page into the rewritable non-volatile memory module 106 are illustrated.

Referring to FIG. 9, in step S901, the memory management circuit 202 groups the physical pages into a plurality of physical page groups according to the write speed of each physical page. For example, as described above, the memory management circuit 202 groups the physical pages into a first physical page group and a second physical page group, wherein the speed of writing data into the physical pages (i.e., the first physical pages) of the first physical page group is faster than the speed of writing data into the physical pages (i.e., the second physical pages) of the second physical page group.

In step S903, the data compression/decompression circuit 208 compresses the page data to generate compressed data and calculates a data compression ratio corresponding to the compressed data.

In step S905, the memory management circuit 202 writes the compressed data into one of the physical pages in the corresponding physical page group according to the data compression ratio.

Figure 10:
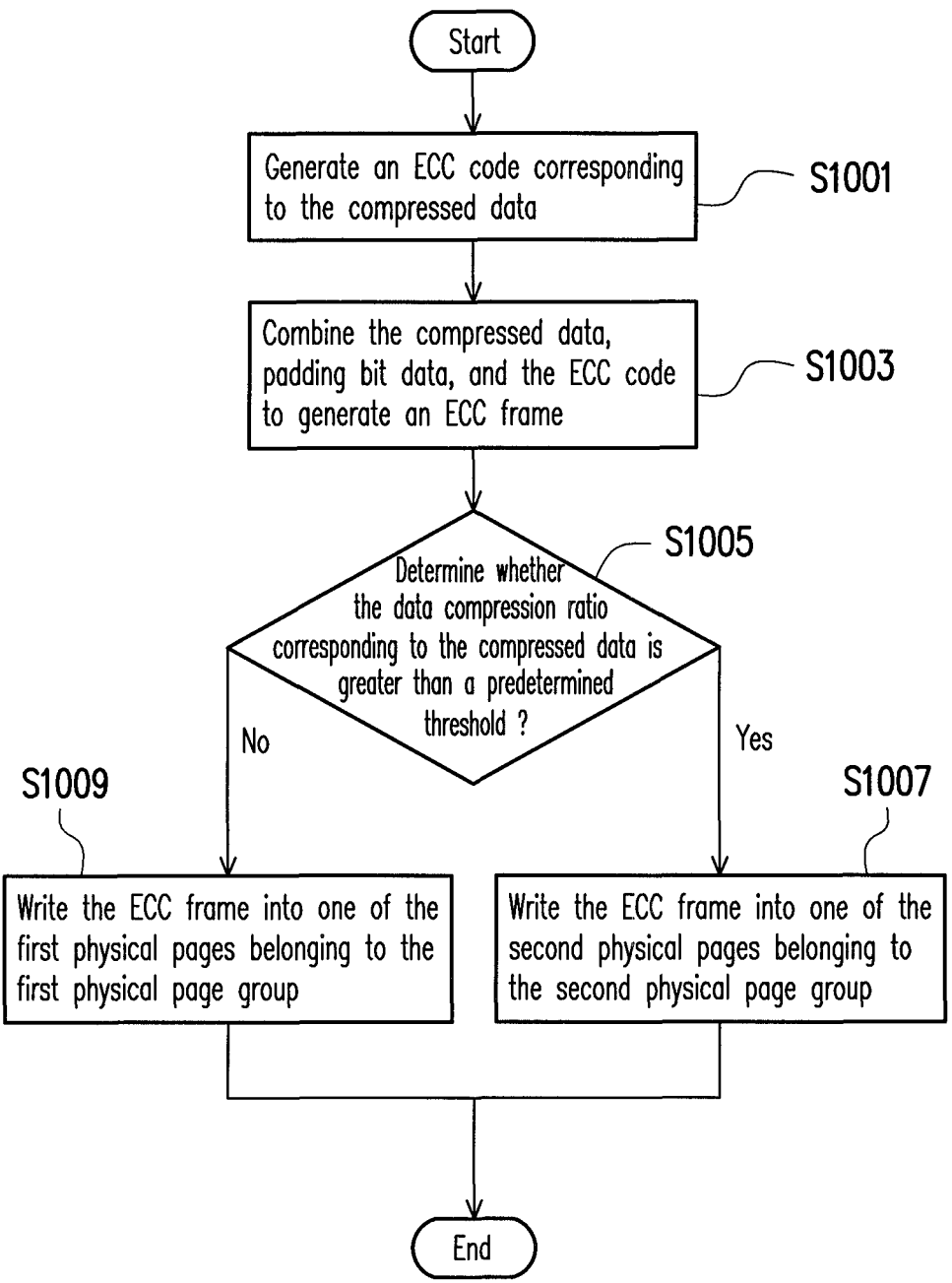
FIG. 10 is a detailed flowchart of step S905 in FIG. 9 according to an exemplary embodiment of the invention.

FIG. 10 is a detailed flowchart of step S905 in FIG. 9 according to an exemplary embodiment of the invention.

Referring to FIG. 10, in step S1001, the ECC circuit 210 generates an ECC code corresponding to the compressed data.

Then, in step S1003, the memory management circuit 202 combines the compressed data, padding bit data, and the ECC code to generate an ECC frame. In step S1005, the memory management circuit 202 determines whether the data compression ratio corresponding to the compressed data is greater than a predetermined threshold. Herein, the predetermined threshold may be 1.333. However, the value of the predetermined threshold is not limited herein, and which may also be set as any other suitable value according to the compression algorithm adopted by the data compression/decompression circuit 208.

If the data compression ratio corresponding to the compressed data is greater than the predetermined threshold, in step S1007, the memory management circuit 202 writes the ECC frame into one of the second physical pages belonging to the second physical page group.

If the data compression ratio corresponding to the compressed data is not greater than the predetermined threshold, in step S1009, the memory management circuit 202 writes the ECC frame into one of the first physical pages belonging to the first physical page group.

It should be mentioned that because the physical pages are alternatively used for storing data, after writing the page data, the memory management circuit 202 updates the mapping relationship between the logical page and the physical pages in the mapping table.

Figure 11:
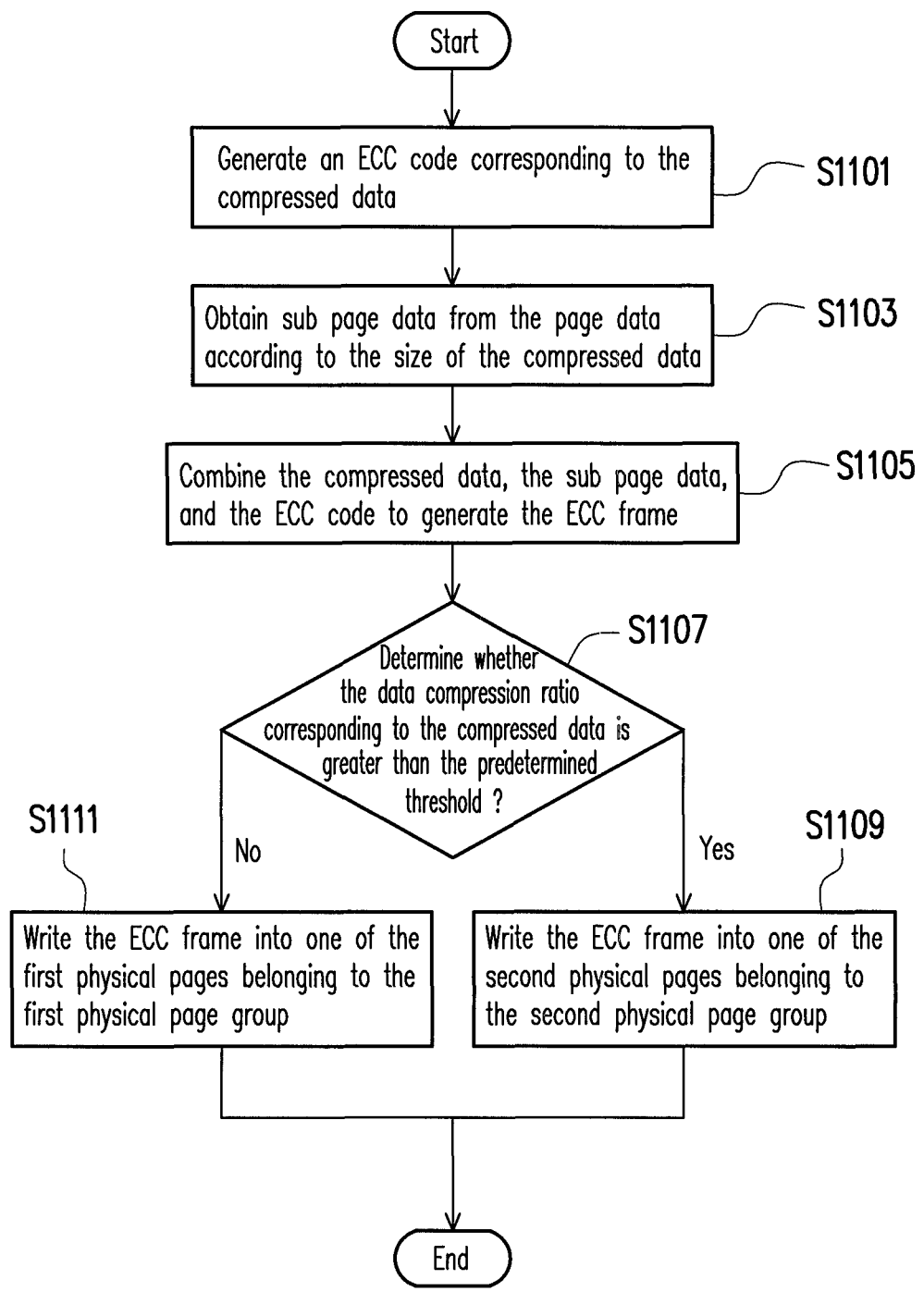
FIG. 11 is a detailed flowchart of step S905 in FIG. 9 according to another exemplary embodiment of the invention.

FIG. 11 is a detailed flowchart of step S905 in FIG. 9 according to another exemplary embodiment of the invention.

Referring to FIG. 11, in step S1101, the ECC circuit 210 generates an ECC code corresponding to the compressed data.

Then, in step S1103, the memory management circuit 202 obtains sub page data from the page data according to the size of the compressed data. Next, in step S1105, the memory management circuit 202 combines the compressed data, the sub page data, and the ECC code to generate the ECC frame, and in step S1107, the memory management circuit 202 determines whether the data compression ratio corresponding to the compressed data is greater than the predetermined threshold.

If the data compression ratio corresponding to the compressed data is greater than the predetermined threshold, in step S1109, the memory management circuit 202 writes the ECC frame into one of the second physical pages belonging to the second physical page group.

If the data compression ratio corresponding to the compressed data is not greater than the predetermined threshold, in step S1111, the memory management circuit 202 writes the ECC frame into one of the first physical pages belonging to the first physical page group.

Additionally, it should be understood that the flowchart illustrated in FIG. 9, FIG. 10, and FIG. 11 is only an example, and the present invention is not limited to the execution sequence and steps illustrated in foregoing figures.

It should be mentioned that when page data belonging to a plurality of continuous logical pages is to be written into the rewritable non-volatile memory module 106, the memory management circuit 202 respectively compresses the page data and generates corresponding compressed data. In particular, the memory management circuit 202 re-sorts the compressed data according to the data compression ratios of the compressed data so that the compressed data having its data compression ratio greater than the predetermined threshold is written into the second physical pages and the compressed data having its data compression ratio not greater than the predetermined threshold is written into the first physical pages. Herein, the memory management circuit 202 records the mapping relationship between the logical pages corresponding to the page data and the physical pages in which the compressed data is actually written to allow the compressed data to be correctly read.

In the present exemplary embodiment, the memory management circuit 202 groups the physical pages into a plurality of physical page groups according to the write speeds of the physical pages, so as to write compressed data having different data compression ratios. However, in another exemplary embodiment, the memory management circuit 202 may also group the physical blocks into a first physical block group and a second physical block group to write compressed data having different data compression ratios. In particular, when the physical blocks belonging to the first physical block group are used for writing data, the memory management circuit 202 only uses fast physical pages for writing the data, and when the physical blocks belonging to the second physical block group are used for writing data, the memory management circuit 202 uses fast physical pages or slow physical pages for writing the data.

Figure 12:
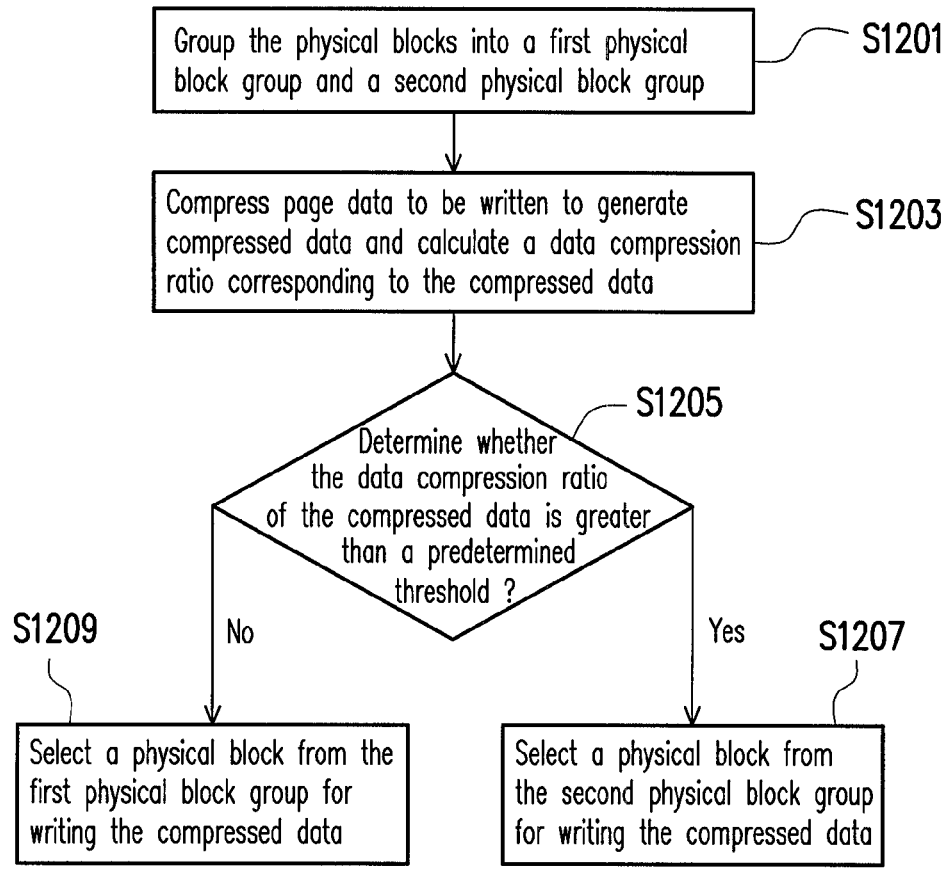
FIG. 12 is a flowchart of a data writing method according to another exemplary embodiment of the invention.

FIG. 12 is a flowchart of a data writing method according to another exemplary embodiment of the invention, wherein the steps of writing a page data belonging to a logical page into the rewritable non-volatile memory module 106 are illustrated.

Referring to FIG. 12, in step S1201, the memory management circuit 202 groups the physical blocks into a first physical block group and a second physical block group.

In step S1203, the data compression/decompression circuit 208 compresses the page data to generate compressed data and calculates a data compression ratio corresponding to the compressed data.

In step S1205, the memory management circuit 202 determines whether the data compression ratio of the compressed data is greater than a predetermined threshold.

If the data compression ratio of the compressed data is greater than the predetermined threshold, in step S1207, the memory management circuit 202 selects a physical block from the second physical block group to write the compressed data.

If the data compression ratio of the compressed data is not greater than the predetermined threshold, in step S1209, the memory management circuit 202 selects a physical block from the first physical block group to write the compressed data. Accordingly, compressed data with a smaller data compression ratio is written into physical pages with higher reliabilities (i.e., fast physical pages), so that the production of any error bit can be avoided.

In summary, according to the data writing method, the memory controller, and the memory storage apparatus of the exemplary embodiments, data to be written is compressed so that more error bits can be corrected by using an existing ECC circuit and the data accuracy can be ensured. Additionally, physical pages are grouped and physical pages with higher reliabilities are used for storing data with smaller data compression ratios, so that the reliability of data access can be effectively improved. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method for writing page data into a rewritable non-volatile memory module, wherein the rewritable non-volatile memory module has a plurality of physical blocks, and each of the physical blocks has a plurality of physical pages, the data writing method comprising:

grouping the physical pages into a plurality of physical page groups according to write speed of each of the physical pages by a memory controller, wherein the physical page groups includes a first physical page group and a second physical page group and write speed of writing data into the physical pages belonging to the first physical page group are faster than write speed of writing data into the physical pages belonging to the second physical page group;

compressing the page data to generate compressed data by the memory controller;

calculating a data compression ratio corresponding to the compressed data by the memory controller; and writing the compressed data into one of the physical pages in a corresponding physical page group among the physical page groups according to the data compression ratio by the memory controller, wherein the step of writing the compressed data into one of the physical pages in the corresponding physical page group among the physical page groups according to the data compression ratio comprises:

generating an error checking and correcting (ECC) code corresponding to the compressed data by the memory controller;

generating an ECC frame according to the compressed data and the ECC code by the memory controller;

determining whether the data compression ratio corresponding to the compressed data is greater than a predetermined threshold by the memory controller;

when the data compression ratio corresponding to the compressed data is greater than the predetermined threshold, writing the ECC frame into one of the physical pages belonging to the second physical page group by the memory controller; and when the data compression ratio corresponding to the compressed data is not greater than the predetermined threshold, writing the ECC frame into one of the physical pages belonging to the first physical page group by the memory controller.

2. The data writing method according to claim 1, wherein the step of generating the ECC frame according to the compressed data and the ECC code comprises:

combining the compressed data, the ECC code, and at least one padding bit data to generate the ECC frame by the memory controller, wherein the size of the ECC frame is equal to one physical page capacity.

3. The data writing method according to claim 1, wherein the step of generating the ECC frame according to the compressed data and the ECC code comprises:

obtaining sub page data from the page data by the memory controller; and combining the compressed data, the ECC code, and the sub page data to generate the ECC frame by the memory controller, wherein the size of the ECC frame is equal to one physical page capacity.

4. The data writing method according to claim 1, wherein the rewritable non-volatile memory module further comprises a control circuit, and the control circuit inserts dummy data behind the compressed data and the ECC code.

5. The data writing method according to claim 1 further comprising:

receiving a plurality of additional page data by the memory controller;

respectively compressing the additional page data to generate a plurality of additional compressed data by the memory controller;

calculating a data compression ratio corresponding to each of the additional compressed data by the memory controller;

re-sorting the additional compressed data according to the data compression ratios corresponding to the additional compressed data by the memory controller; and writing the re-sorted additional compressed data into the physical pages by the memory controller.

6. A data writing method for writing page data into a rewritable non-volatile memory module, wherein the rewritable non-volatile memory module has a plurality of physical blocks, each of the physical blocks has a plurality of physical pages, and the physical pages are categorized into a plurality of fast physical pages and a plurality of slow physical pages, the data writing method comprising:

grouping the physical blocks into a first physical block group and a second physical block group by a memory controller;

compressing the page data to generate compressed data by the memory controller;

calculating a data compression ratio corresponding to the compressed data by the memory controller;

determining whether the data compression ratio corresponding to the compressed data is greater than a predetermined threshold by the memory controller;

when the data compression ratio corresponding to the compressed data is greater than the predetermined threshold, writing the compressed data into a fast physical page or a slow physical page among the physical pages in the physical blocks belonging to the second physical block group by the memory controller; and when the data compression ratio corresponding to the compressed data is not greater than the predetermined threshold, writing the compressed data into a fast physical page among the physical pages in the physical blocks belonging to the first physical block group by the memory controller.

7. A memory controller for writing page data from a host system into a rewritable non-volatile memory module, wherein the rewritable non-volatile memory module has a plurality of physical blocks, and each of the physical blocks has a plurality of physical pages, the memory controller comprising:

a host interface, configured to couple to the host system;

a memory interface, configured to couple to the rewritable non-volatile memory module;

a data compression/decompression circuit, coupled to the host interface and configured to compress the page data to generate compressed data and calculate a data compression ratio corresponding to the compressed data;

a memory management circuit, coupled to the data compression/decompression circuit; and an ECC circuit coupled to the memory management circuit and configured to generate an ECC code corresponding to the compressed data;

wherein the memory management circuit is configured to group the physical pages into a plurality of physical page groups according to write speed of each of the physical pages, wherein the physical page groups includes a first physical page group and a second physical page group and write speed of writing data into the physical pages belonging to the first physical page group are faster than write speed of writing data into the physical pages belonging to the second physical page group, wherein the memory management circuit generates an ECC frame according to the compressed data and the ECC code and determines whether the data compression ratio corresponding to the compressed data is greater than a predetermined threshold, when the data compression ratio corresponding to the compressed data is greater than the predetermined threshold, the memory management circuit writes the ECC frame into one of the physical pages belonging to the second physical page group, and when the data compression ratio corresponding to the compressed data is not greater than the predetermined threshold, the memory management circuit writes the ECC frame into one of the physical pages belonging to the first physical page group.

8. The memory controller according to claim 7,
wherein the memory management circuit combines the compressed data, the ECC code, and at least one padding bit data to generate the ECC frame,
wherein the size of the ECC frame is equal to one physical page capacity.

9. The memory controller according to claim 7,
wherein the memory management circuit obtains sub page data from the page data and combines the compressed data, the ECC code, and the sub page data to generate the ECC frame,
wherein the size of the ECC frame is equal to one physical page capacity.

10. The memory controller according to claim 7, wherein the rewritable non-volatile memory module further comprises a control circuit, and the control circuit inserts dummy data behind the compressed data and the ECC code.

11. The memory controller according to claim 7, wherein the memory management circuit receives a plurality of additional page data, respectively compresses the additional page data to generate a plurality of additional compressed data, calculates a data compression ratio corresponding to each of the additional compressed data, re-sorts the additional compressed data according to the data compression ratios corresponding to the additional compressed data, and writes the re-sorted additional compressed data into the physical pages.

12. A memory storage apparatus, comprising:
a connector, configured to couple to a host system;
a rewritable non-volatile memory module, having a plurality of physical blocks, wherein each of the physical blocks has a plurality of physical pages; and
a memory controller, coupled to the connector and the rewritable non-volatile memory module,
wherein the memory controller is configured to receive page data from the host system,
wherein the memory controller is further configured to compress the page data to generate compressed data and calculate a data compression ratio corresponding to the compressed data,
wherein the memory controller is further to group the physical pages into a plurality of physical page groups according to write speed of each of the physical pages, wherein the physical page groups includes a first physical page group and a second physical page group and write speed of writing data into the physical pages belonging to the first physical page group are faster than write speed of writing data into the physical pages belonging to the second physical page group,
wherein the memory controller generates an ECC code corresponding to the compressed data,
wherein the memory controller generates an ECC frame according to the compressed data and the ECC code and determines whether the data compression ratio corresponding to the compressed data is greater than a predetermined threshold,
when the data compression ratio corresponding to the compressed data is greater than the predetermined threshold, the memory controller writes the ECC frame into one of the physical pages belonging to the second physical page group, and
when the data compression ratio corresponding to the compressed data is not greater than the predetermined threshold, the memory controller writes the ECC frame into one of the physical pages belonging to the first physical page group.

13. The memory storage apparatus according to claim 12,
wherein the memory controller combines the compressed data, the ECC code, and at least one padding bit data to generate the ECC frame,
wherein the size of the ECC frame is equal to one physical page capacity.

14. The memory storage apparatus according to claim 12,
wherein the memory controller obtains sub page data from the page data and combines the compressed data, the ECC code, and the sub page data to generate the ECC frame,
wherein the size of the ECC frame is equal to one physical page capacity.

15. The memory storage apparatus according to claim 12, wherein the rewritable non-volatile memory module further comprises a control circuit, and the control circuit inserts a dummy data behind the compressed data and the ECC code.

16. The memory storage apparatus according to claim 12, wherein the memory controller receives a plurality of additional page data, respectively compresses the additional page data to generate a plurality additional compressed data, calculates a data compression ratio corresponding to each of the additional compressed data, re-sorts the additional compressed data according to the data compression ratios corresponding to the additional compressed data, and writes the re-sorted additional compressed data into the physical pages.

* * * * *